(12) United States Patent
Mortensen

(10) Patent No.: US 6,521,277 B1
(45) Date of Patent: Feb. 18, 2003

(54) PROCESS FOR THE PREPARATION OF COLOSTRUM

(75) Inventor: Uffe Mortensen, Oslo (NO)

(73) Assignee: Kare Fonnelop, Oslo (NO)

( * ) Notice: Subject to any disclaimer, the term of this patent is extended or adjusted under 35 U.S.C. 154(b) by 0 days.

(21) Appl. No.: 09/674,126

(22) PCT Filed: Apr. 29, 1998

(86) PCT No.: PCT/NO98/00133

§ 371 (c)(1), (2), (4) Date: Feb. 14, 2001

(87) PCT Pub. No.: WO99/55168

PCT Pub. Date: Nov. 4, 1999

(51) Int. Cl.⁷ .............................. C12H 1/00; A23C 3/00
(52) U.S. Cl. ....................................... 426/422; 426/580
(58) Field of Search .................................. 426/422, 580

(56) References Cited

U.S. PATENT DOCUMENTS 5,147,548 A  9/1992 Heis et al.

FOREIGN PATENT DOCUMENTS

GB  2267811  12/1993

Primary Examiner—Anthony J. Weier
(74) Attorney, Agent, or Firm—Banner & Witcoff, Ltd.

(57) ABSTRACT

A process for the preparation of an essentially bacteria-free colostrum by means of microfiltration, which process includes that defatted, natural colostrum (first milk) is poured into a balance tank; subsequently the feeding pump is pumping the concentrate to a booster pump; the booster pump circulates the concentrate across a filter membrane wherein the pressure difference in the membrane rendered filtration of the concentrate possible; the concentrate is flowing across a heating/cooling unit to keep a constant process temperature before the concentrate returns to the booster pump; filtrated colostrum (the filtrate) circulates across the filter membrane to keep a constant transmembrane pressure; the filtrate is drained without pressure loss on the filtrate side of the filter.

3 Claims, 1 Drawing Sheet

PROCESS FOR THE PREPARATION OF COLOSTRUM

Figure 1:
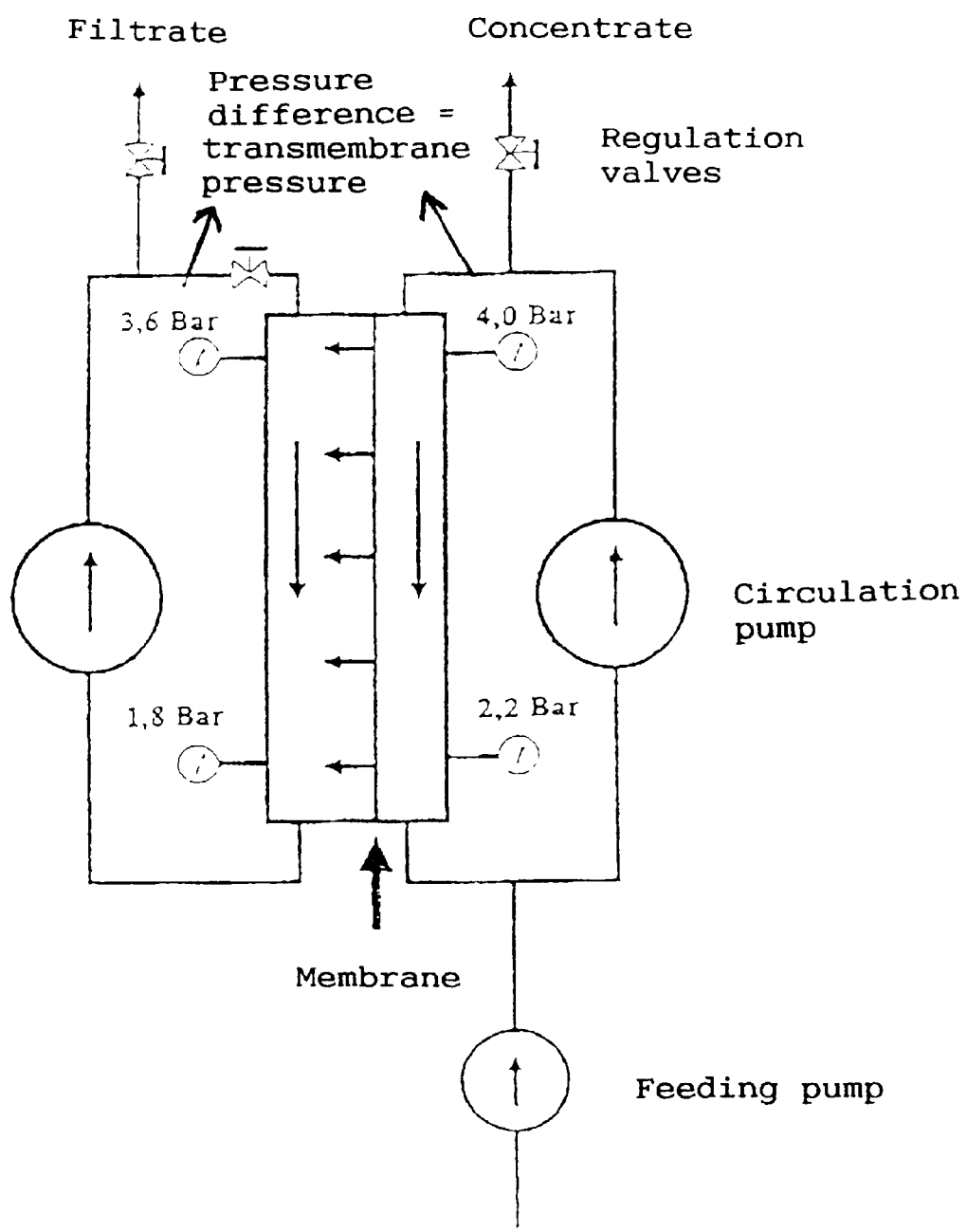

The present invention is related to a process for the preparation of essentially bacteria-free colostrum.

Colostrum, or first milk, is the breast milk which is secreted by mammals during the last part of pregnancy and the first few days after pertuision. Colostrum obtains a little less fat than the later milk and is rich in proteins, especially immunoglobulins. Colostrum possess a number of outstanding and interesting properties, a.o. owing to the high nutritional value. The proteins in colostrum, and especially immunoglobulins, have a wide range of uses.

Bovine colostrum may also contain a high number of bacteria, about $10^6$–$10^8$ bacteria/ml. However, problems have been present for a long time relating to methods to reduce the bacteria content in colostrum for thereby to be able to produce a bacteria-free colostrum composition.

Heat sterilization (pasteurisation) of colostrum to remove the bacteria is not possible because heating will denature and coagulate the proteins (this is especially important in relation to biologically active proteins).

A common prior art method for sterilizing solutions is microfiltration. However, microfiltration of colostrum has not been possible so far, because the casein in colostrum immediately clogs the microfilters and makes the filtration impossible (see German Patent C 2 813 984).

PCT Application Wo 85/10192 describes a nutritional drink based on colostrum. This product was sterilized, after separation of the fat from the colostrum with a conventional method, by removing the casein by precipitation (with hydro-chloric acid) followed by microfiltration of the resulting "whey".

U.S. Pat. No. 5,147,548 describes preparation of a sterile-filtered colostrum with a retained casein content. According to the method of this publication a defatted colostrum solution is acidified with hydrochloric acid until the casein precipitates at a pH of 4–5 and then returns to solution by lowering of the pH to 2–3.5. Then, the colostrum solution can be microfiltrated and the pH of the solution is subsequently returned to the original value by adding NaOH. Thus, such a method requires, in addition to the micro-filtration, two additional steps which make the procedure for the preparation of bacteria-free colostrum more complicated and far more expensive. In addition, product obtained by this method is not a "natural" colostrum, owing to the addition of an acid, followed by a base, which results in a higher salt content than in "natural" colostrum. It is also an open question whether these additions of acids and alkali will effect and change the natural proteins in colostrum (especially the valuable immunoglobulins).

By the present invention it was surprisingly discovered a process by which, after the fat had been removed, natural colostrum, including the casein, could be micro-filtrated. This process provides a colostrum composition wherein the bacteria content is reduced up to 99.9%, and otherwise wherein all the natural components, besides fat, are retained without application of any additives or complicating and-demanding supplementary treatments. All the previously preformed attempts in the prior art of directly microfiltration of defatted colostrum have been unsuccessful, an in U.S. Pat. No. 5,147,548, column 1, it is concluded that: "Filtration sterilization, the simplest and most effective method of eliminating the bacteria and the method that protects the proteins, cannot be employed with colostrum because the casein immediately clogs up the filter".

By the present invention it was surprisingly discovered that colostrum can be microfiltrated by using a larger booster pump and increasing the velocity of the concentrate.

In a common microfiltration of milk the booster pump rate (the milk which flows through filter) is 6 $m^3$/hour. In microfiltration of colostrum the filter will clog up at this rate.

By the present invention it was surprisingly discovered that colostrum can be microfiltrated by using a larger booster pump and increasing the velocity of concentrate to between 7.2 and 7.8 $m^3$/hour.

Thus, the present invention provides a process for microfiltration of natural, defatted colostrum for the preparation of an essentially bacteria free (99.9%) colostrum wherein the original components (especially the protein composition) are retained in essentially native form and without any use of additives.

Thus, the process of the present invention for the preparation of essentially bacteria free colostrum comprises:

Defatted colostrum is poured into a balance tank; subsequently the concentrate is transported to a booster pump by means of the feeding pump; the booster pump circulates the concentrate across a membrane wherein the pressure difference in the membrane will provide filtration of the concentrate; the concentrate flows across a heating/cooling equipment to maintain a constant operating temperature prior to returning to the booster pump; the filtered colostrum (filtrate) circulates across the filter to maintain a constant transmembrane pressure; the filtrate is drained in the filtrate side of the filter without reduction of pressure.

The process of the present invention is illustrated by the following, non-limiting, example, and FIG. 1, which is a schematic drawing of a non-limiting example of a microfiltration device used in the microfiltration process of the invention.

EXAMPLE

Microfiltration of Colostrum

In this experiment 40 kg defatted, frozen colostrum was used.

Filtration plant: Mino MF-plant (dead volume about 7 kg)

Filtration membrane: SCT ceramic membrane Pore size: 1.4$\mu$ Membrane area: 0.2 $m^2$ The frozen colostrum was heated to 50° C. and microfiltrated.

Samples from different steps of the process were analyzed. In the following table operating data from an experiment of microfiltration of colostrum are shown.

TABLE 1

Process data for microfiltration of colostrum

| Time | °C. | Feed P1 Bar | Concentrate in P2 Bar | Filtrate in P3 Bar | Filtrate out P4 Bar | Concentrate out P5 Bar | Concentrate Brix | Filtrate Brix | Concentrate Loop Flow M³/h | Concentrate Flow L/h | Filtrate Loop Flow M³/h |
|---|---|---|---|---|---|---|---|---|---|---|---|
| Start 13.43 | | | | | | | | | | | |
| 13.50 | 56.0 | 2.7 | 5.80 | 4.50 | 2.40 | 3.10 | 11.00 | 8.00 | 7.33 | 450.00 | 1.56 |
| 14.00 | 56.0 | 2.7 | 5.70 | 4.50 | 2.40 | 3.00 | 11.00 | 10.00 | 7.33 | 432.00 | 1.55 |
| 14.18 | 63.0 | 2.7 | 5.80 | 4.50 | 2.40 | 3.00 | 11.00 | 10.00 | 7.40 | 432.00 | 1.58 |
| 14.45 | 53.0 | 2.7 | 5.80 | 4.50 | 2.40 | 3.00 | 11.60 | 10.50 | 7.20 | 480.00 | 1.54 |
| 15.00 | 51.0 | 2.7 | 5.80 | 4.50 | 2.40 | 3.00 | 11.10 | 10.00 | 7.20 | 468.00 | 1.56 |
| 15.15 | 52.0 | 2.7 | 5.80 | 4.50 | 2.40 | 3.00 | 11.00 | 9.50 | 7.20 | 450.00 | 1.55 |
| 15.35 | 54.0 | 2.7 | 5.80 | 4.50 | 2.40 | 3.00 | 12.00 | 11.00 | 7.20 | 432.00 | 1.56 |
| stop 16.00 | | | | | | | | | | | |

Explanation of the table:
Time: Assay time point
° C.: Temperature of the product during the process
Feed P1 Bar: Feeding pump pressure
Concentrate in P2 Bar: Pressure of the concentrate (product prior to filtration) before entering the filter
Filtrate in P3 Bar: Pressure of the filtrate (product after filtration) before entering the filter
Concentrate out P5 Bar: Concentrate procedure after leaving the filter
Filtrate out P4 Bar: Filtrate procedure after leaving the filter
Concentrate Brix: Solid content in the product prior to filtration
Filtrate Brix: Solid content in the product after filtration
Concentrate Loop flow m³/h Product rate upon entering the filter
Concentrate flow L/h: Rate of the concentrate returning to the balance tank
Filtrate Loop flow m³/h: Rate of the filtrate circulating upon entering the filter Table 2 below shows analysis results from samples from the microfiltrated colostrum regarding microbe content, antibody content and dry matter content.

TABLE 2

Microfiltrated colostrum
Microbiology (embedding in agar), antibody and dry matter content

| Sample, incubated at 37° C. for 1–2 days | | 2 days Total kim/ml | Dilution | 1 day Coli/ml | Dilution | Dry matter g/30 ml | mg antibody/ml | Comments |
|---|---|---|---|---|---|---|---|---|
| Sample 1: Batch 1 | (after microfilt.) | 0 | | 0 | | 27.8 | | |
| Sample 2: Batch 2 | " | 0 | | 0 | | 28.2 | | |
| Sample 3: Batch 3 | " | 0 | | 0 | | 27.2 | 43.0 | Average of batch |
| Sample 4: Batch 4 | " | 0 | | 0 | | 26.2 | | |
| Sample 5: Batch 5 | " | 0 | | 0 | | 27.2 | | |
| Sample 6: Batch 6 | (before microfilt.) | 1.07:10⁵ | 1:1000 | 10 | 1:10 | 30.4 | 50.0 | |

Standards:
Positive control: Bovine IgG
Negative control: Filtrate

What is claimed is:

1. A process for the preparation of an essentially bacteria-free colostrum by means of microfiltration, the process comprising:

pouring defatted, natural colostrum into a balance tank to form a concentrate;

pumping the concentrate from the balance tank to a booster pump using a feeding pump;

wherein the booster pump circulates the concentrate across a filter membrane to form a filtrate;

wherein the concentrate flows across a heating/cooling unit to keep a constant process temperature during filtration;

wherein the filtrate circulates past the filter membrane to keep a constant transmembrane pressure; and wherein the filtrate is drained without pressure loss on the filtrate side of the filter.

2. Process according to claim 1, wherein the filter membrane is a ceramic membrane.

3. Process according to claim 1, wherein the bacteria content in colostrum is reduced by at least 99.9%.